United States Patent [19]

Stovall et al.

[11] Patent Number: 5,501,268

[45] Date of Patent: Mar. 26, 1996

[54] METHOD OF ENERGY LOAD MANAGEMENT USING PCM FOR HEATING AND COOLING OF BUILDINGS

[75] Inventors: Therese K. Stovall; John J. Tomlinson, both of Knoxville, Tenn.

[73] Assignee: Martin Marietta Energy Systems, Inc., Oak Ridge, Tenn.

[21] Appl. No.: 83,678

[22] Filed: Jun. 28, 1993

[51] Int. Cl.$^6$ ................. F25B 29/00; F24J 3/02
[52] U.S. Cl. ................. 165/1; 165/2; 165/10; 165/12; 165/18; 392/340; 392/344; 392/346; 252/70; 126/618; 126/619
[58] Field of Search ................. 392/346, 340, 392/344; 165/18, 1, 2, 12, 10; 252/70; 126/618, 619

[56] References Cited

U.S. PATENT DOCUMENTS

| | | | |
|---|---|---|---|
| 2,677,243 | 5/1954 | Telkes | 392/346 |
| 2,856,506 | 10/1958 | Telkes | 392/346 |
| 3,876,859 | 4/1975 | Franz et al. | 392/346 |
| 3,975,620 | 8/1976 | Hallgreen et al. | 392/344 |
| 4,213,032 | 7/1980 | Olsen et al. | 392/344 |
| 4,248,291 | 2/1981 | Jarmul | 392/346 |
| 4,294,078 | 10/1981 | MacCracken | 165/18 |
| 4,332,690 | 6/1982 | Kimura et al. | 252/70 |
| 4,360,442 | 11/1982 | Reedy et al. | 252/70 |
| 4,498,459 | 2/1985 | Korin et al. | 126/400 |
| 4,532,917 | 8/1985 | Taff et al. | 126/400 |
| 4,702,853 | 10/1987 | Benson et al. | 252/70 |
| 4,908,166 | 3/1990 | Salyer | 252/70 |
| 4,924,935 | 5/1990 | Van Winckel | 165/10 |
| 5,053,446 | 10/1991 | Salyer | 252/70 |
| 5,085,790 | 2/1992 | Hormansdorfer | 252/70 |

OTHER PUBLICATIONS

"Analysis of Wallboard Containing A Phase Change Material" Tomlinson and Heberle. Aug. 12–17, 1990.
"Activities In Support Of The Wax–Impregnated Wallboard Concept" Kedl and Stovall, ORNL for U.S. Dept. of Energy. (no date).

"Wallboard with Latent Heat Storage for Passive Solar Applications" R. J. Kedl, May 1991 for U.S. Dept. of Energy.

"Potential Benefits of Distributed PCM Thermal Storage" D. A. Neeper Jun. 1989, LANL for U.S. Dept. of Energy.

*Primary Examiner*—John K. Ford
*Attorney, Agent, or Firm*—Martin J. Skinner; H. W. Adams

[57] ABSTRACT

A method of energy load management for the heating and cooling of a building. The method involves utilizing a wallboard as a portion of the building, the wallboard containing about 5 to about 30 wt. % a phase change material such that melting of the phase change material occurs during a rise in temperature within the building to remove heat from the air, and a solidification of the phase change material occurs during a lowering of the temperature to dispense heat into the air. At the beginning of either of these cooling or heating cycles, the phase change material is preferably "fully charged". In preferred installations one type of wallboard is used on the interior surfaces of exterior walls, and another type as the surface on interior walls. The particular PCM is chosen for the desired wall and room temperature of these locations. In addition, load management is achieved by using PCM-containing wallboard that form cavities of the building such that the cavities can be used for the air handling duct and plenum system of the building. Enhanced load management is achieved by using a thermostat with reduced dead band of about the upper half of a normal dead band of over three degree. In some applications, air circulation at a rate greater than normal convection provides additional comfort.

14 Claims, 7 Drawing Sheets

METHOD OF ENERGY LOAD MANAGEMENT USING PCM FOR HEATING AND COOLING OF BUILDINGS

The U.S. Government has rights in this invention pursuant to Contract No. DE-AC05- 84OR21400 awarded by U.S. Department of Energy, Office of Conservation and Renewable Energy, with Martin Marietta Energy Systems, Inc.

TECHNICAL FIELD

The present invention relates generally to a system for use in increasing the efficiency of heating and cooling a building, and more particularly to thermal energy storage using selected phase change materials uniformly incorporated throughout interior wall covering materials such that energy load management is achieved.

BACKGROUND ART

It is well recognized that thermal energy storage, through the use of phase change materials, is of value in passive solar applications for the heating of buildings. These phase change materials absorb heat via changing from a solid to a liquid, during the presence of solar heat impinging upon the material. Then, during the time when there is no heat input to the building from the sun, the materials release heat into the building as the phase change material returns to a solid state. The particular phase change material, referred to hereinafter as a PCM, is chosen for its melting and solidification temperatures to match the particular application.

In some applications, the PCM is placed within containers positioned within the area that is to be heated. Still other installations utilize the PCM within containers positioned within the walls of the area. The earliest of PCM's were water/ice and various organics and salts exhibiting melting/thawing characteristics over a few degrees of temperature change.

In relatively recent developments, the PCM is made a part of the structural building materials, and particularly in gypsum wallboard. Apparently paraffin and paraffin-like materials, even in their melted states, adhere to the large surface area provided by the dendritic needles of calcium sulfate comprising the core of the wallboard. In particular, up to 30 wt % paraffin has been incorporated into gypsum wallboard during investigations at the University of Dayton Research Institute, Dayton, Ohio. The University of Dayton research is detailed in U.S. Pat. Nos. 4,908,166 and 5,053,446 issued to I. O. Salyer on Mar. 13, 1990 and Oct. 1, 1991, respectively. Further, initial studies have demonstrated that this composition has about the same flammability as ordinary wood such that no additional danger is created within a generally wooden structure. While the incorporation of a PCM (such as paraffin) will be of assistance in passive solar heated buildings, relatively few buildings are utilizing passive solar heating systems and therefore the wall board incorporating the PCM has little commercial use for this application.

In contrast, there exists a large use of electrical power for heating and cooling of buildings. Due to the demand upon electric utilities, load management practices have been encouraged among users. One type of electric load management has been the use of timers such that some heating requirements (as the heating of water) occurs during off-peak periods. However, load management by power interruption in systems for heating and cooling is difficult, particularly for residential use.

Other references relevant to the use of phase change materials are U.S. Pat. Nos. 4,294,078 issued to C. D. MacCracken on Oct. 13, 1981; 4,332,690 issued to H. Kimura et al, on Jun. 1, 1982; 4,360,442 issued to J. D. Reedy et al, on Nov. 23, 1982; 4,498,459 issued to E. Korin et al on Feb. 12, 1985; 4,532,917 issued to D. C. Taff et al, on Aug. 6, 1985; and 4,924,935 issued to W. V. Winckel on May 15, 1990.

Accordingly, it is an object of the present invention to provide a system for electrical load management for buildings that continues to serve the building's thermal demand while discontinuing power consumption during periods of high demand upon an electric utility.

It is another object of the present invention to utilize phase change materials to distribute a selected temperature within a building over extended time periods.

A further object of the present invention is to utilize phase change materials incorporated into building construction materials such that temperatures within a building are modified with an accompanying management of the electrical load supplied to the building.

Another object of the present invention is to utilize gypsum wallboard having incorporated therein a phase change material, with such wallboard in different portions of the structure having different phase change materials so as to optimize electrical load management of buildings during both heating and cooling cycles.

These and other objects of the present invention will become apparent upon a consideration of the drawings that follow together with a complete description thereof.

DISCLOSURE OF THE INVENTION

In accordance with the present invention, electrical load management for a building is provided by incorporating a phase change material into one or more of the building components. Typically, this building component is gypsum wall board as used to cover walls and ceilings. This phase change material is selected to melt and then resolidify under conditions particular to the building. One such phase change material is a type of paraffin mixture, with this mixture being incorporated into gypsum-type wallboard. The paraffin mixtures contain several hydrocarbons, and the melting/solidifying temperatures depend on the relative concentration of these components. Particularly valuable load management is achieved by using gypsum wallboard with one PCM mixture on interior building walls, and a gypsum wallboard with another PCM mixture and phase change temperature on the inner surface of exterior building walls. Similarly, PCM-impregnated gypsum wallboard can be utilized to construct interior wall cavities that can be used as plenum and duct portions of air distribution systems of a building for achieving electric load management.

BEST MODE FOR CARRYING OUT THE INVENTION

The utilization of a PCM-loaded wallboard material for electric load management was originated by the applicants. Although developed principally to utilize a gypsum-type wallboard, the present invention is applicable to any wallboard that uniformly incorporates an appropriate PCM. In order to analyze the effectiveness of this load management, a verified code TRNSYS ("A Transient System Simulation Program" as published in Engineering Experiment Station Report 38-13, Solar Energy Laboratory, University of Wisconsin-Madison, Madison, Wis., September 1990) was utilized. This had been previously modified to incorporate a separately verified model of the PCM-containing gypsum wallboard as reported in "Analysis of Wallboard Containing a Phase Change Material", Proc. of the 25th Intersociety Energy Conversion Engineering Conference, Vol. 4, Aug. 12–17, 1990, Reno, Nev. Both of these documents are incorporated herein for reference purposes in the teaching of the particular simulation programs. The code permits the explicit definition of each building component and a variety of control strategies. It iterates as necessary to perform an energy balance on the structure for each time step over a given test period. Time steps varied for each test case, and were generally less than 0.01 hour. A mid-country (Nashville, Tenn.) climate was chosen for temperature variations.

A model structure consisted of a simple one-zone structure 17 meter long by 13 meter wide by 3 meter high. A thickness of wall board of 0.019 meter (nominal ¾ in.) was utilized, and conventional average specific heat values of wall, ceiling, window and door were utilized. Although a range (5 to 30 wt. %) of PCM content wallboards were studied, a majority of evaluations was conducted for 10 wt % PCM in the wallboard.

Figure 1:
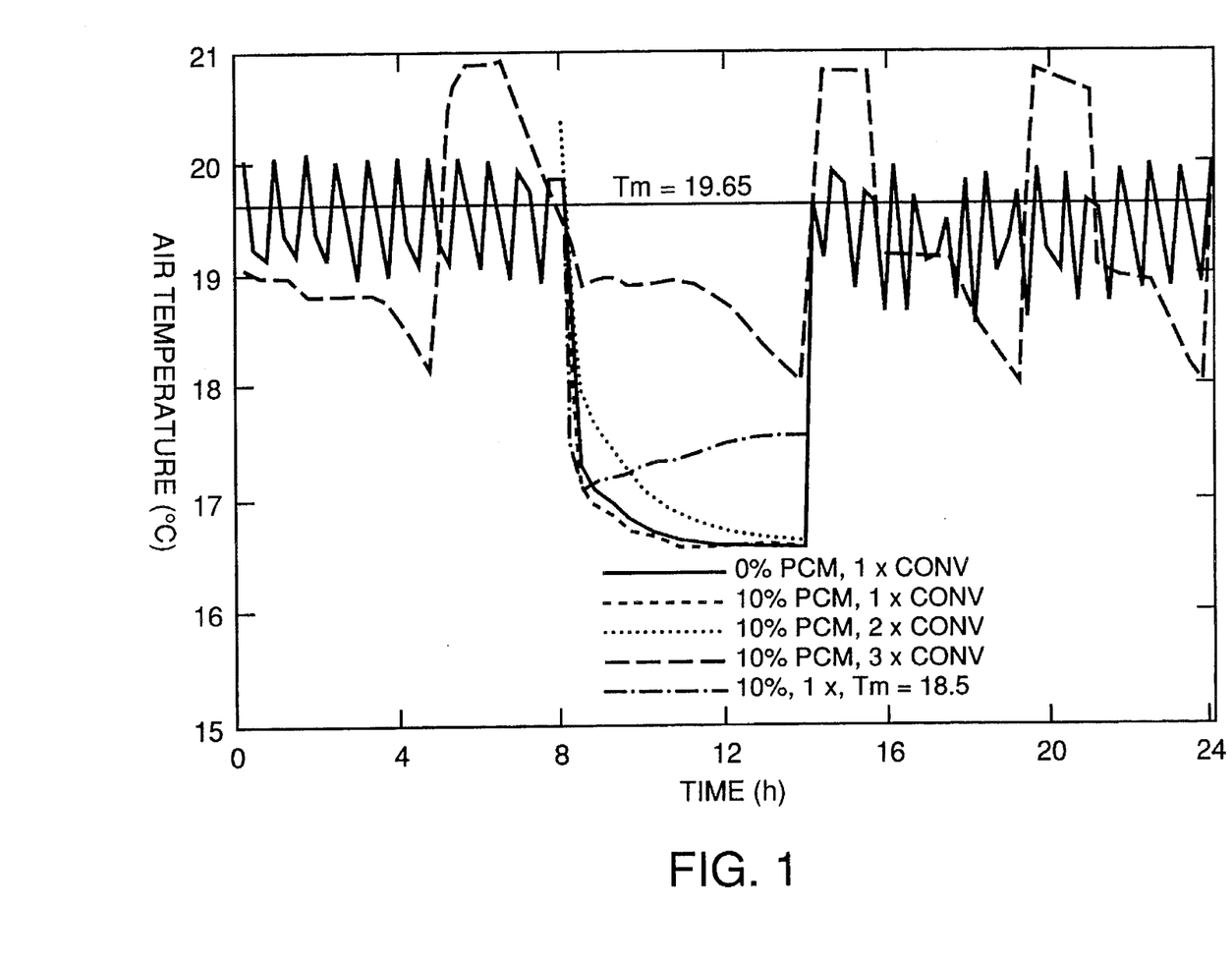
FIG. 1 is plot of computed room air temperature during load management comparing wallboard with and without phase change material, and showing the effects of various convection coefficients.
Figure 2:
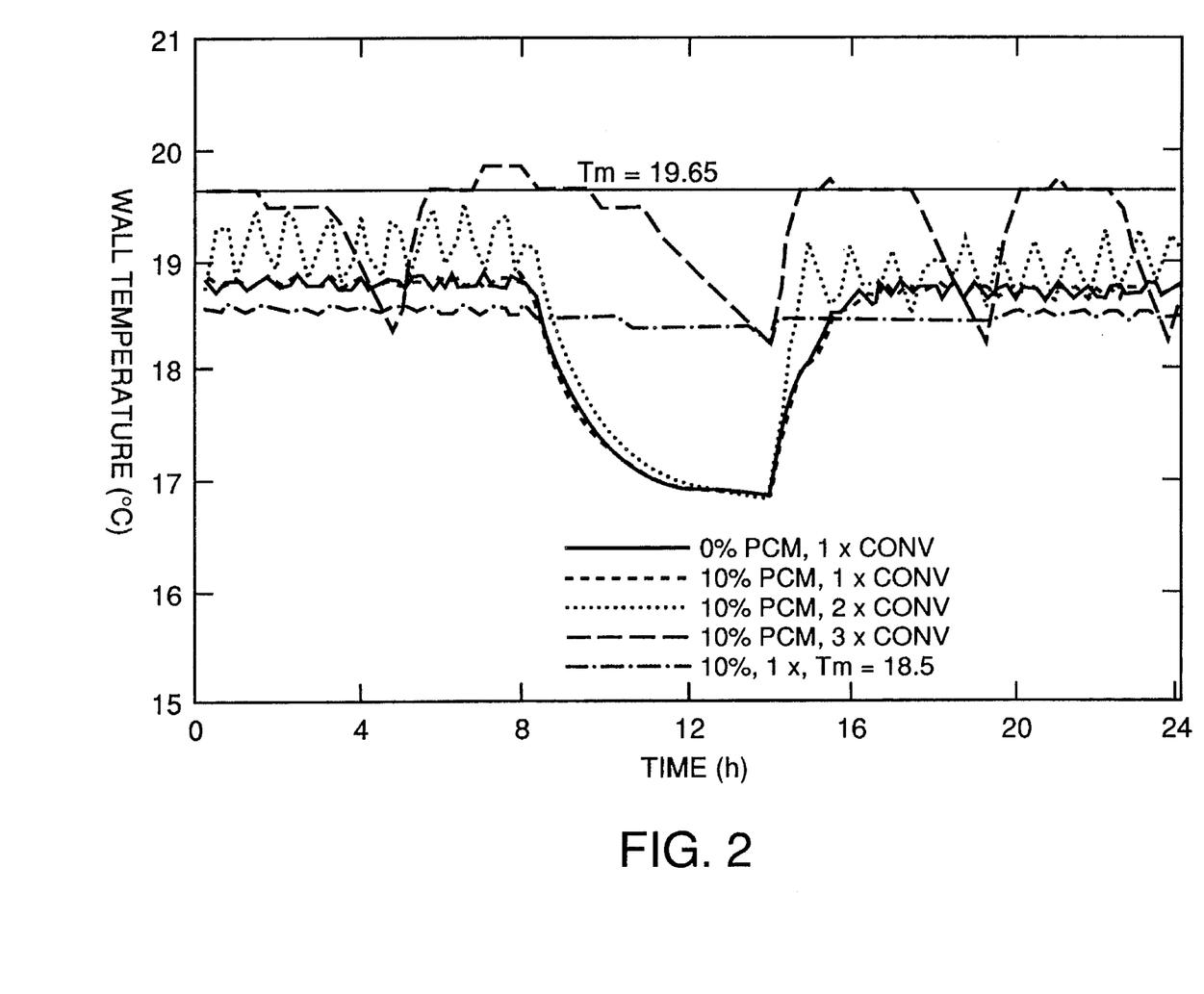
FIG. 2 is plot of computed temperature of the interior surface of exterior walls for the same variables as utilized in FIG. 1.

The initial tests of PCM wallboard as a load management storage device during heating were made with a very simple arrangement. A PCM melt temperature was chosen equal to the thermostat set point, the deadband and convection coefficient were selected, and the clock thermostat was set so that the heater could not come on during the on-peak period regardless of the indoor air temperature. Thus, when the desired room temperature is reached, the PCM should be fully melted (fully charged for heating). Without any further input from a heating energy source, the PCM gradually solidifies, giving up heat to the surrounding air. Results from these initial tests, as depicted in FIGS. 1 and 2, showed that load management was generally possible, with some exceptions due to heater control strategy. FIG. 1 shows the internal (room) air temperature (which affects comfort of occupants) while FIG. 2 shows the interior surface temperature of the exterior wall of the structure. Results are compared with and without the use of PCM in the form of paraffin with a melting temperature of 19.65° C.

The effect of increasing the air speed, thereby increasing the convection coefficient, is apparent in FIG. 1, where all temperatures are 15 minute averages. The desired temperature in this study was between 18° and 21.3° C. and the peak time was chosen to be between 8:00 a.m. and 2:00 p.m. Without thermal storage the room air temperature fell to about 16.5° C. or 1.5° C. lower than desired. When a 10 wt % paraffin-containing wallboard is evaluated, the paraffin having a melting point in the middle of the desired comfort temperature range, natural convection (1X) had essentially no effect on the room air temperature. Doubling the convection coefficient (2X) increased heat transfer between the wall and the room but was still considered insufficient to maintain the room air temperature in the desired comfort range. However, when the convection coefficient is tripled (3X), the room air temperature is maintained above 18° C. throughout the on-peak period. For the 1-X (natural convection) and the 2-X cases, it can be seen from FIG. 2 that the temperature of the wall surface does not reach the melt temperature (the PCM is not fully charged) and the latent storage capacity of the wall is unused. In FIG. 2 the flat portions above the melting temperature represent times during which the internal nodes of the wall were melting, i.e, were storing latent heat. The flat portions below the melting temperature are times when the internal nodes were freezing, i.e., releasing latent heat.

In these tests the latent storage capacity was utilized effectively only at the highest convection coefficients (3X). This increased convection, as by using a blower, enhanced the exchange of energy between the wall and the air. In some applications, this high air flow may be distracting to occupants; however, in other applications this may not be a problem.

A variation of the analysis of the use of PCM's for increased heat transfer between air and the wallboard was made with a PCM that melts at a lower temperature. Specifically, the PCM used in this study had a melting temperature of 18.5° C. The results are also indicated in FIGS. 1 and 2 where this increased heat transfer occurred at natural convection (1X). While this improvement was demonstrated, the room temperature still dropped to nearly 17° C. The results in FIG. 2 indicate that the wall surface was at the melt temperature for much of the time and that the PCM was releasing heat (i.e., freezing) during the on-peak time as desired.

Figure 3:
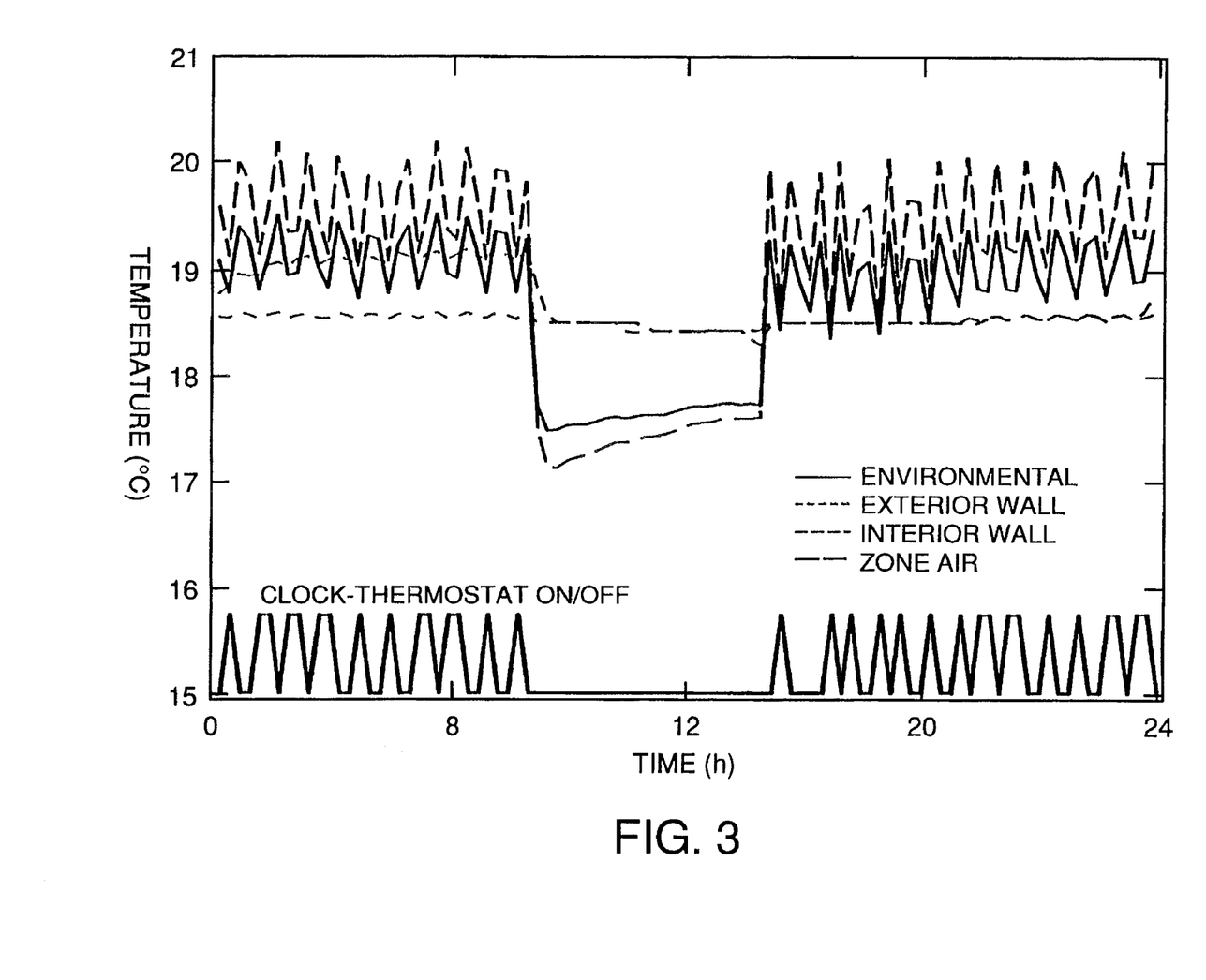
FIG. 3 is a plot of measured temperatures and clock thermostat signals for a case using a 10% PCM wallboard with a 18.5° C. melting temperature for the case of natural convection and a thermostat set point of 19.65° C.

FIG. 3 plots the relationship between the interior and exterior wall surfaces, the interior air temperature and the effective "environmental" or "comfort" temperature as felt by an occupant. These data are from the case using a PCM having a melting temperature of 18.5° C. Under the conditions the PCM of the interior wall was fully melted at about 0.5° C. above the melt temperature at the start of the on-peak period and remained at the melt temperature throughout this period. The exterior was still "charging" at the start of the on-peak period and began to drop in temperature just before the end of the period. The environmental (comfort) temperature was moderated by the surface temperatures so that the minimum temperature experienced by an occupant is approximately 0.3° C. higher than the minimum air temperature.

Figure 4:
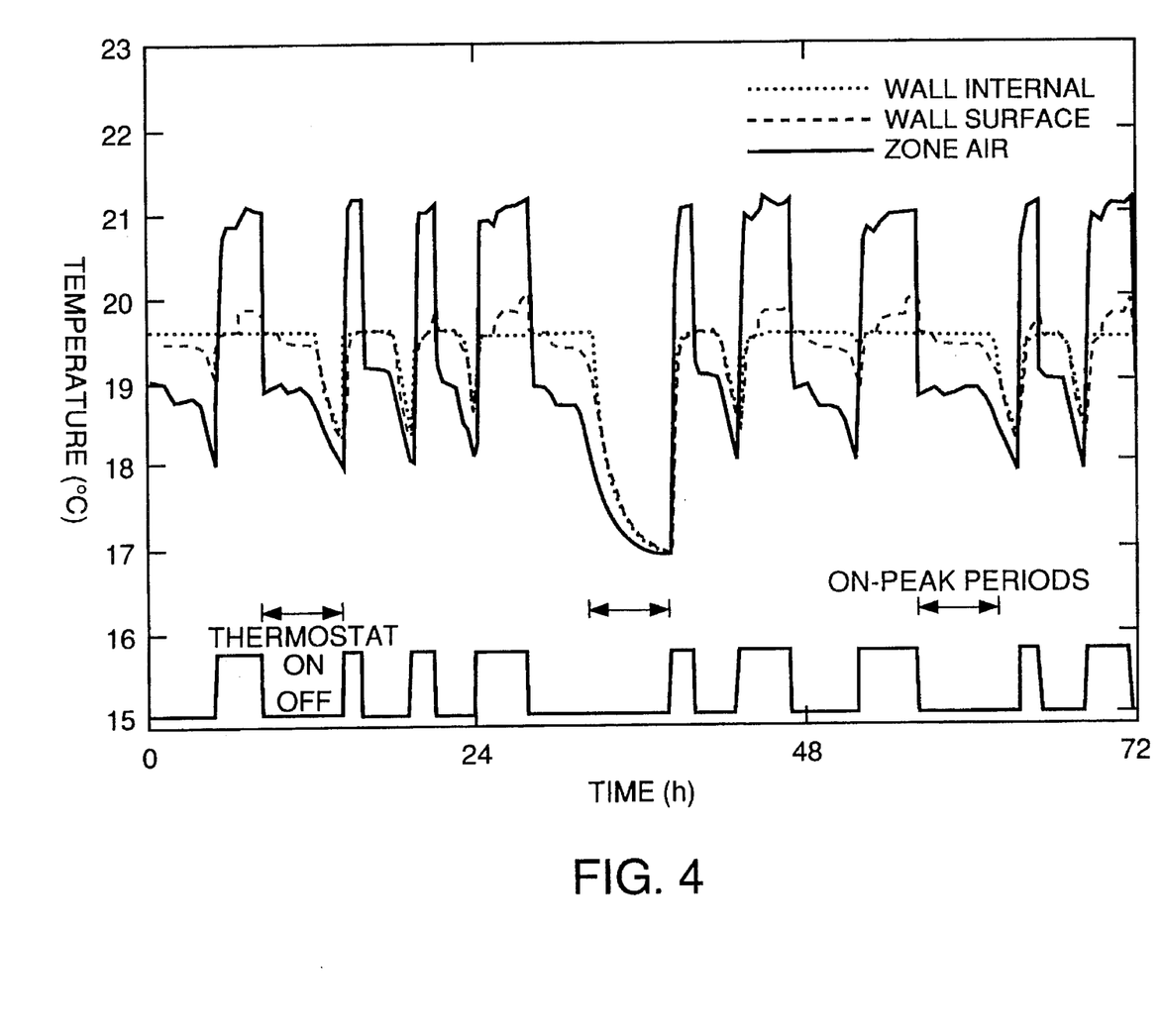
FIG. 4 is a temperature plot of wall surface, internal wallboard and room, with thermostat signals, when air distribution at three times the natural convection was utilized in the computation showing the importance of thermostat management as an integral part of the system.

Normal operation of a room thermostat has been found to play an important role in the matter of effective use of PCM's. Using a case of a 10% PCM wallboard, the PCM having a melting temperature of 19.65° C. and a convection coefficient of 3X, load management was studied over a three day period. The data of that study are plotted in FIG. 4. These data include the temperatures of the wall interior, the wall surface and the zone (room) temperature. The "on-peak" periods during which heater operation was prohibited are also shown. For this study the thermostat had a dead band of 3.3° C. While the first day operation was generally satisfactory, the overall load management was unsatisfactory.

Figure 5:
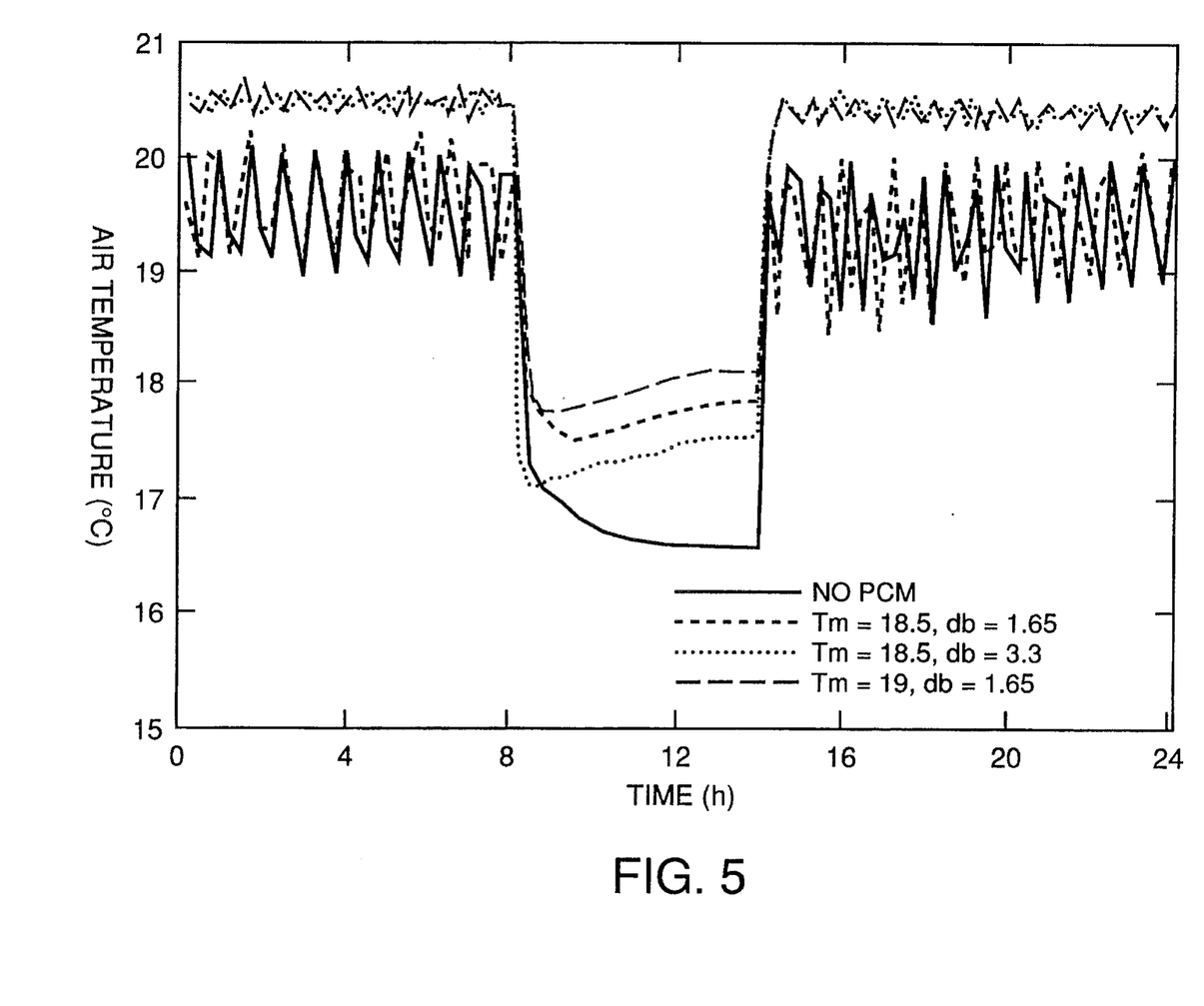
FIG. 5 is a plot of computed room air temperature for a case of natural convection, using PCM-containing wallboards of two different melting points, and two different thermostat control strategies.
Figure 6:
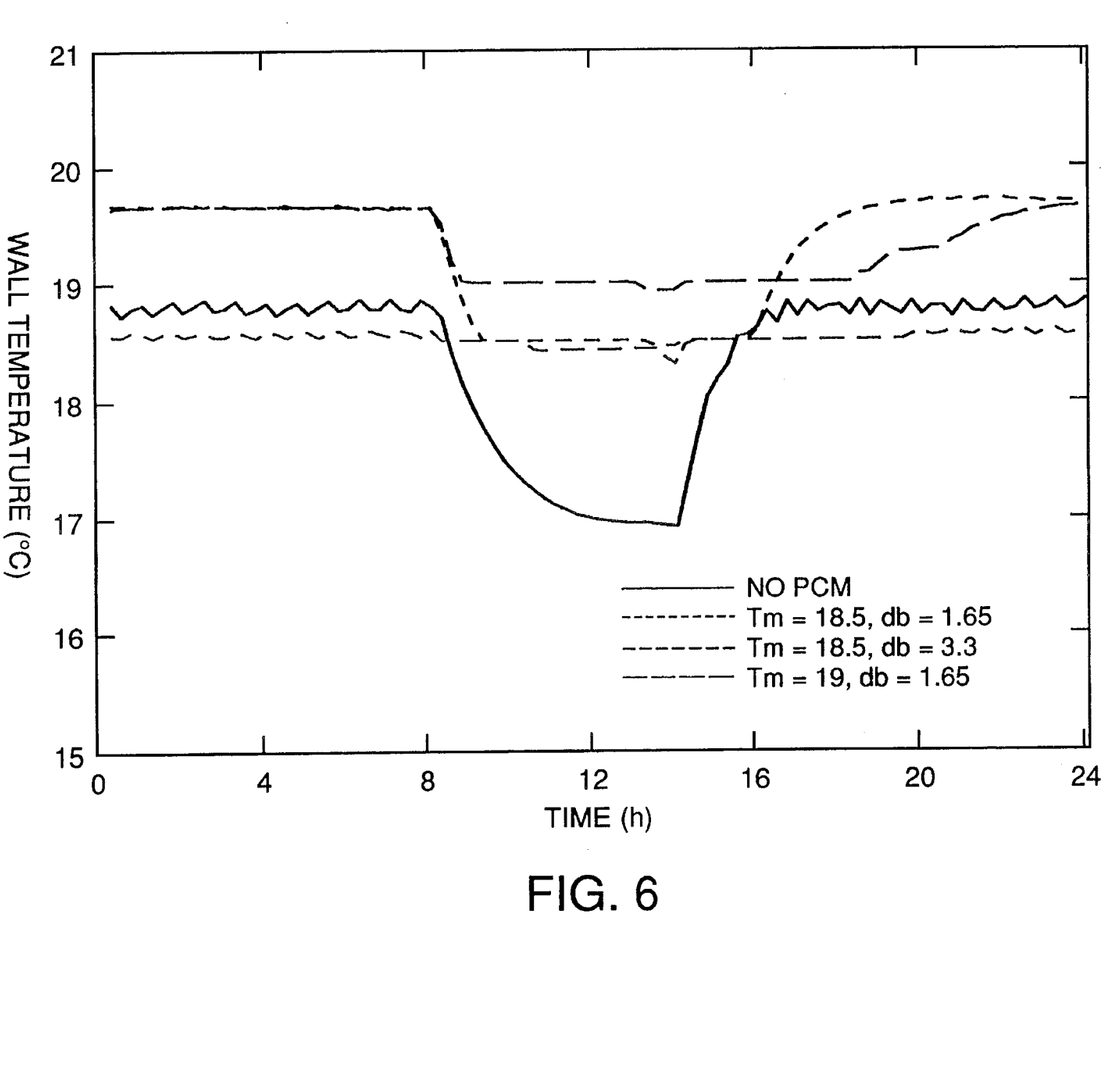
FIG. 6 is a plot of calculated exterior wall (interior surface) temperatures for the conditions used in obtaining FIG. 5.

In contrast, when the dead band was restricted to the upper half of the acceptable range, the room temperature was only affected slightly, but the air temperature is maintained above the PCM melt temperature throughout the off-peak charging period. The improved results are plotted in FIGS. 5 and 6, which shows these results in comparison with the wider dead band, as well as the effect of a change in the melting temperature of the PCM. FIG. 5 shows the plot of the room temperature, and FIG. 6 shows the plot of the exterior wall interior surface temperature. In both the data includes that for two PCM melting temperatures, 1X (natural) convection coefficient, two thermostat set points, and two thermostat dead bands. These data show the improvement for both a higher melting temperature PCM and for a narrower dead band.

Figure 7:
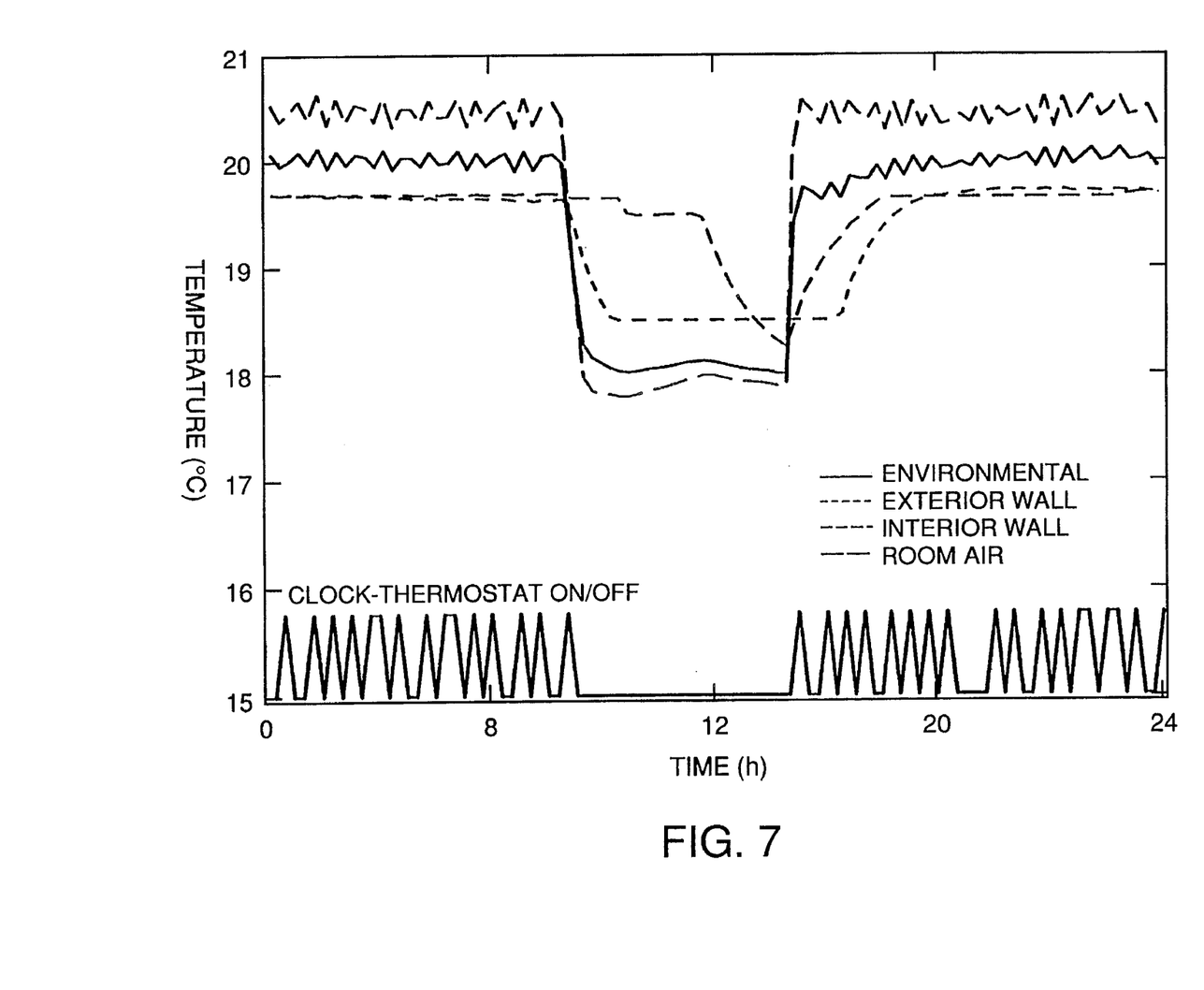
FIG. 7 is a plot of temperature and clock-thermostat signals for the dual wallboard case at natural convection, a thermostat set point of 20.5° C. and a deadband of 1.65° C.

The combined results of these tests were then utilized to create a system for load management that is based upon natural convection (1X). This system utilized wallboard having 10% PCM, with that of the interior walls having a PCM with a melting temperature of 19.65° C., and the exterior walls having a PCM with a melting temperature of 18.5° C. While this is a preferred melting point differential, the differential can be up to about four degrees C. The thermostat was set to control the temperature between 19.65° and 21.3° C. during the off-peak period. During the on-peak period, the controls were set to turn off the heater of the energy source unless the air temperature dropped below 17.5° C., thus mimicking an override feature. Results with this dual wall board construction are plotted in FIG. 7, these results including environmental, exterior wall, interior wall and room temperatures. The thermostat dead band for this study was 1.65° C. with a set point of 20.5° C.

The model using two different PCM-containing wallboards was tested over a three-month winter period using the average temperatures for Nashville, Tenn. The results were compared to those for non-load management. Energy use during this period for the management versus non-management was about the same, at least within about 1%. However, the amount of energy used during the on-peak period was reduced by about 74% without any sacrifice in comfort. In fact, the discomfort index was reduced by about 20% for the load management model.

The foregoing depicts the present invention as applied to the cases where only heating of the building is concerned. In addition, the incorporation of PCM's in wallboard provides significant load management values during seasons where cooling is required. During periods of operation of cooling equipment of the energy source, as governed by the thermostat, the PCM in the wallboard remains in solidified form (is in a fully charged state for cooling). When this cooling equipment is not operated, energy is absorbed from the air by the PCM in going from the solid phase to the liquid phase, thus cooling the building. The cycle is repeated when the PCM reaches the melting temperature which is about equal to the set point of the thermostat, plus any dead band. Thus, for a system in which a building is both heated and cooled, a wallboard having a PCM of a selected melting temperature can be chosen for construction.

In a preferred system, and operation of that system, the main thermostat has an output that controls the operation of the energy source, as well as at least two input "signals". The first signal is derived from a clock input that sets the selected time period for preferred de-energization of the energy source. The second input is derived from temperature measurement. Thus, either the clock or the temperature can energize or de-energize the energy source. With the temperature input, even if the clock input indicates the select time period of peak power utilization (when the energy source should be de-energized) the occurrence of an adverse temperature can cause energization of the energy source, thus providing an "override".

Most buildings utilize a duct and plenum system for the distribution of air, either heated or cooled. In addition, many buildings have cavities in the walls which serve, or can serve, as return air ducts. These cavities are often bounded by conventional wallboard. Further energy load management can be effected by placing a fan within these cavities, and using the cavities as a supply duct-plenum. Such a cavity fan is operated by an independent thermostat so as to circulate the air past the wallboard surfaces during a selected temperature range. During any heating cycle, this duct-plenum system is at a temperature above the desired temperature of a room of the building. Likewise, during any cooling cycle, the supply duct-plenum system is at a temperature below the desired temperature of the room. The supply duct-plenum, if surfaced with the wallboard having selected PCM's with a melting temperature substantially midway of center points of air comfort temperature ranges for heating and cooling, enhances the load management. Thus, the PCM within the wallboard assists in load management during both the heating and cooling cycles.

Although the principal desire is to assist in electrical load management for heating and cooling, load management for all types of energy sources can be effected. Thus, the method described herein is useful for gas-fired systems, coal-fired heating, etc.

While certain specific temperatures and arrangements are described herein, they are for illustrating and not for limiting the present invention. Rather, the invention is to be limited only by the appended claims and their equivalents.

We claim:

1. A method of energy load management for avoiding energy source use during selected time periods during selected heating and cooling of a building in which air motion conveys air within a selected temperature range for comfort of occupants of said building, said method comprising:

providing a first wallboard material on interior portions of said building removed from effects of temperature exterior to said building, said first wall board material containing therein a first phase change material having a melting point temperature substantially in a center of said selected temperature range for comfort;

providing a second wallboard material on interior surfaces of portions of said building subject to effects of temperature exterior to said building, said second wallboard material containing therein a second phase change material having a melting point temperature less than, but within about four degrees C. of said melting temperature of said first phase change material;

providing a thermostat within said building for setting and determining temperature within said building, said thermostat controlling de-activating said energy source at a beginning of said selected time period and activating said energy source at a conclusion of said selected time period;

conditioning air in an interior of said building with said energy source at a temperature to achieve an initial charged state of said first and second phase change materials at said beginning of said selected time period;

de-activating said energy source at said beginning of said selected time period whereby said first and second phase change materials change phase from said initial charged state to provide said selected heating and cooling of said building; and activating said energy source at said conclusion of said selected time period whereby said first and second phase change materials change phase to return to said initial charged states.

2. The method of claim 1 further comprising:

providing a first input to said thermostat, said first input having a signal related to temperature within said building;

providing a second input to said thermostat, said second input having a signal related to a clock setting of said selected time period; and providing an output signal from said thermostat to said energy source for said activation and de-activation of said energy source, said output signal controlled by at least one of said signals of said first and second inputs whereby said signal of said first input controls said activation of said energy source to assure said initial charged state of said phase change material prior to said de-activation of said energy source at said beginning of said selected time period.

3. The method of claim 2 wherein said selected of said heating and cooling is heating of said air in said building and said energy source is a heating system, and wherein said first input prevents said de-activating of said energy source prior to said phase change material in said wallboard material being melted such that heat is given to said interior air of said building during solidification of said phase change material after said de-activating step and prior to said activating step.

4. The method of claim 2 wherein said selected of said heating and cooling is cooling of said air in said building and said energy source is a cooling system, and wherein said first input prevents said deactivating of said energy source prior to said phase change material in said wallboard material being solidified such that heat is removed from said interior air of said building during melting of said phase change material after said de-activating step.

5. The method of claim 2 wherein:

said first wallboard material contains about 10 weight percent said phase change material having a melting temperature of about 19.65° C.;

said second wallboard material contains about 10 weight percent said second phase change material having a melting temperature of about 18.5° C.; and said first input to said thermostat provides activating of said energy source between about 19.65° C. and about 21.3° C.

6. The method of claim 1 wherein said wallboard material is gypsum wallboard containing from about 5 to about 30 weight percent phase change material.

7. The method of claim 1 further comprising:

passing said conditioned air from said energy source through internal wall cavities within said building such that said cavities create a duct-plenum system for said building, said wall cavities being within walls having provided thereon a third wall board material, said third wallboard material containing a third phase change material having a melting temperature substantially midway between centers of selected temperature ranges for cooling and heating said building; and providing a second thermostat associated with a fan for circulating said conditioned air through said duct-plenum system during said de-activating of said energy source.

8. The method of claim 7 wherein said third wallboard material is gypsum wallboard containing from about 5 to about 30 weight percent phase change material.

9. A method of energy load management for avoiding energy source use during selected time periods during selected heating and cooling of a building in which air motion conveys air within a selected temperature range for comfort of occupants of said building, said method comprising:

providing a first wallboard material upon interior wall portions of said building removed from effects of temperature exterior to said building, said wallboard material containing therein a first phase change material, said first phase change material having a melting point to change phase at a temperature substantially equal to a temperature in a center of said selected temperature range for comfort;

providing a second wallboard material upon interior surfaces of building portions subject to effects of temperature exterior to said building, said second wallboard material containing a phase change material having a melting point less than, but within about four degrees C., of said melting temperature of said first phase change material providing a thermostat within said building for setting and determining temperature within said building, said thermostat having a first input signal related to temperature within said building, a second input signal related to a clock setting of said selected time period, and an output signal to said energy source for activation and de-activation of said energy source, said output signal controlled by at least one of said first and second input signals whereby said first input signal controls activation of said energy source to assure an initial fully charged state of said phase change material prior to de-activating of said energy source at a beginning of said selected time period and said second input signal controls activating of said energy source at a conclusion of said selected time period;

conditioning air in an interior of said building with said energy source at a temperature to achieve said initial fully charged state of said phase change material at said beginning of said selected time period;

de-activating said energy source at said beginning of said selected time period whereby said phase change material changes phase from said initial fully charged state to provide said selected heating and cooling of said building; and activating said energy source at said conclusion of said selected time period whereby said phase change material changes phase to return to said initially fully charged state.

10. The method of claim 9 wherein said first wallboard material and said second wallboard material are gypsum wallboards containing from about 5 to about 30 weight percent phase change materials.

11. The method of claim 9 wherein said selected of said heating and cooling is heating of said air in said building and said energy source is a heating system, and wherein said first input prevents said de-activating of said energy source prior to said phase change material in said wallboard material being fully melted such that heat is given to said interior air of said building during solidification of said phase change material after said de-activating step and prior to said activating step.

12. The method of claim 9 wherein said selected of said heating and cooling is cooling of said air in said building and said energy source is a cooling system, and wherein said first input prevents said deactivating of said energy source prior to said phase change material in said wallboard material being fully solidified such that heat is removed from said interior air of said building during melting of said phase change material after said de-activating step.

13. The method of claim 9 further comprising:

passing said conditioned air from said energy source through internal wall cavities within said building such that said cavities create a duct-plenum system for said building, said wall cavities being within walls having provided thereon a third wall board material, said third wallboard material containing a third phase change material having a melting temperature substantially midway between centers of selected temperature ranges for cooling and heating said building; and providing a second thermostat associated with a fan for circulating said conditioned air through said duct-plenum system during said de-activating of said energy source.

14. The method of claim 13 wherein said third wallboard material is gypsum wallboard containing from about 5 to about 30 weight percent phase change material.

* * * * *